United States Patent
Pijlman et al.

(10) Patent No.: US 9,157,582 B2
(45) Date of Patent: Oct. 13, 2015

(54) LIGHTING STRIP

(75) Inventors: Fetze Pijlman, Eindhoven (NL);
Hendrikus Hubertus Petrus Gommans, Eindhoven (NL); Wilhelmus Petrus Adrianus Johannus Michiels, Reusel (NL); Jochen Renaat Van Gheluwe, Lommel (BE); Cornelis Gerardus Maria De Haas, Nuenen (NL); Menno Van Baardwijk, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/119,262

(22) PCT Filed: Jun. 6, 2012

(86) PCT No.: PCT/IB2012/052840
§ 371 (c)(1),
(2), (4) Date: Nov. 21, 2013

(87) PCT Pub. No.: WO2012/168870
PCT Pub. Date: Dec. 13, 2012

(65) Prior Publication Data
US 2014/0092622 A1    Apr. 3, 2014

Related U.S. Application Data

(60) Provisional application No. 61/529,406, filed on Aug. 31, 2011.

(30) Foreign Application Priority Data

Jun. 9, 2011 (EP) .................................... 11169226

(51) Int. Cl.
*F21V 7/04* (2006.01)
*F21K 99/00* (2010.01)
(Continued)

(52) U.S. Cl.
CPC . *F21K 9/52* (2013.01); *F21S 8/026* (2013.01); *G02B 6/0046* (2013.01); *G02B 6/0061* (2013.01); *G02B 6/0076* (2013.01); *G02B 6/0095* (2013.01)

(58) Field of Classification Search
CPC ..................................... F21V 7/00; F21V 7/04
USPC .......................... 362/611, 612, 615, 147, 148
See application file for complete search history.

(56) References Cited

U.S. PATENT DOCUMENTS 6,752,504 B2 * 6/2004 Lee et al. ..................... 362/23.1
7,794,111 B2    9/2010 Huang
(Continued)

FOREIGN PATENT DOCUMENTS

CN    101299109 A    11/2008
DE    19860696 A1    7/2000
(Continued)

*Primary Examiner* — Ali Alavi
(74) *Attorney, Agent, or Firm* — Meenakshy Chakravorty

(57) ABSTRACT

The invention relates to a lighting strip (100) for mounting in or on a panel support element (210) of a modular panel system (200). The lighting strip comprises an optical waveguide (120) having a tapered portion increasing in thickness from the center towards a first side of the lighting strip. The lighting strip also comprises a first plurality of solid state lighting elements (110) placed along the first side of the lighting strip, facing said tapered portion (120). The lighting strip further comprises a reflective surface (140) and a light output surface comprising a glare reducing member (130), each extending between the first side and a second side opposite to the first side. The optical waveguide is located between the reflective surface and the glare reducing member. A lighting system, panel support element (210) and modular panel system (200) including such a lighting strip (100) are also disclosed.

16 Claims, 8 Drawing Sheets

(51) Int. Cl.
*F21V 8/00* (2006.01)
*F21S 8/02* (2006.01)

(56) References Cited

U.S. PATENT DOCUMENTS

| | | |
|---|---|---|
| 2001/0046365 A1 | 11/2001 | Bohle |
| 2008/0232093 A1 | 9/2008 | Kim |
| 2008/0297695 A1* | 12/2008 | Sekiguchi et al. ............... 349/65 |
| 2009/0237958 A1 | 9/2009 | Kim |
| 2010/0073582 A1* | 3/2010 | Konno et al. ................. 348/794 |
| 2012/0243255 A1* | 9/2012 | Yamamoto .................... 362/602 |
| 2013/0135896 A1* | 5/2013 | Kuo ............................... 362/609 |

FOREIGN PATENT DOCUMENTS

| | | |
|---|---|---|
| EP | 2138520 A1 | 12/2009 |
| WO | WO2008058585 A1 | 5/2008 |
| WO | WO2008126023 A2 | 10/2008 |
| WO | WO2009153674 A1 | 12/2009 |

* cited by examiner

LIGHTING STRIP

CROSS-REFERENCE TO PRIOR APPLICATIONS

This application is a U.S. national stage application under 35 U.S.C. §371 of International Application No. PCT/IB2012/052840 filed on Jun. 6, 2012, which claims priority to and the benefit of U.S. Provisional Application 61/529,406 filed Aug. 31, 2011 and European Patent Application No. 11169226.5, filed on Jun. 9, 2011. These applications are hereby incorporated by reference herein.

FIELD OF THE INVENTION

The present invention relates to a lighting strip for use in a modular panel system such as a suspended ceiling. The present invention further relates to a lighting system comprising such a lighting strip, to a support element comprising such a lighting strip, and a modular panel system comprising such a lighting strip.

BACKGROUND OF THE INVENTION

In construction, modular panel systems are commonly used to reduce build cost and construction time. Modular panel systems typically allow for the rapid construction of floors, walls and ceilings, albeit often at the compromise of reduced aesthetic appearance. A prime example of such a modular panel system is a suspended ceiling, which can be found in most professional environments, such as for example office spaces. A suspended ceiling typically comprises a metal or plastic grid defining rectangular or square recesses, which are filled with tiles to form a continuous ceiling.

In such modular systems, e.g. a suspended ceiling, lighting may be integrated into the system, typically by replacing one or more tiles with a lighting unit such as a luminaire. Most suspended ceilings comprise luminaires in which a number of fluorescent light tubes are present. For a number of reasons, such luminaires are not ideal. Firstly, such luminaires are considered aesthetically displeasing, i.e. obtrusive. Secondly, in order to improve light efficiency from such luminaires, they usually contain a reflector, which commonly has a parabolic shape. This however can cause glare for an occupant of the office space if the reflected light exits the luminaire under shallow angles to the plane of the modular system. Glare can be very disturbing in an office environment, as it can obscure the image on a computer monitor and can cause physical discomfort, e.g. headaches or sight problems, to the occupant when being subjected to the glare for a prolonged period of time. This is why health and safety standards such as the IEC60598-1:2008 standard in Europe require lighting solutions to comply with stringent requirements for preventing excessive glare levels.

Solutions exist to overcome glare. A straightforward solution is shown in FIG. 1, in which a suspended ceiling luminaire 10 is shown. The luminaire 10 comprises a plurality of chambers defined by respective parabolic reflectors 12, with a fluorescent light tube 14 fitted in each of the chambers. Each light tube 14 is offset from the light exit plane 10a of the luminaire 10 by a distance d such that light emitted by the fluorescent light tube 14 under a shallow angle is reflected by the parabolic reflector 12, as indicated by the dotted broken arrow. This increases the exit angle of the light, thus reducing glare. A drawback is that this solution leads to relatively bulky luminaires, which can be considered aesthetically unsatisfactory.

Another solution is shown in FIG. 2, in which a luminaire 10 for integration in a suspended ceiling is fitted with a micro-lens optical plate or diffuser 20, which has the function of preventing shallow angle light beams from exiting the luminaire 10. As this causes a substantial amount of light being reflected back into the chamber 11 of the luminaire 10, the luminaire 10 may comprise a reflector 22 to recycle such reflected light. Commonly, the micro-lens optical plate takes the form of a prism plate.

The company SwitchMade offer a light emitting diode based (LED) luminaire marketed under the name Paneos® for integration in a suspended ceiling. This has the advantage of lower energy consumption compared to fluorescent light tube-based luminaires. However, as these luminaires replace tiles in the ceiling, they still disrupt the visual appearance of the suspended ceiling.

The Gemino Company (www.gemino.it) markets a suspended ceiling solution in which the light fittings can be integrated into the band raster of the ceiling. The band raster consists of the main structural beams of the suspended ceiling. With smaller form factor lighting such as LED lighting this is a feasible solution, and has the advantage of the improved appearance of the ceiling due to the fact that no tiles need replacing with luminaires. This however increases the manufacturing complexity of the band raster, and thus the cost of the overall design. Moreover, this solution is unsuitable for retrofitting purposes, and is difficult to maintain as the band raster cannot be easily disassembled for maintenance purposes.

SUMMARY OF THE INVENTION

The present invention seeks to provide a lighting solution that can be easily (retro-) fitted to existing modular panel systems whilst being capable of being designed in compliance with health and safety standards.

In accordance with a first aspect of the present invention, there is provided a lighting strip for mounting in or on a panel support element of a modular panel system, the lighting strip comprising an optical waveguide having a first tapered portion increasing in thickness from the center towards a first side of the lighting strip; a first plurality of solid state lighting elements placed along the first side of the lighting strip; a reflective surface and a light output surface comprising a glare reducing member, each extending between the first side of the lighting strip and a second side of the lighting strip, the second side being opposite to the first side, wherein the optical waveguide is located between the reflective surface and the glare reducing member.

The present invention is based on the realization that a very compact lighting strip can be produced that can be fitted onto or integrated into a panel support element of a modular panel system such as a suspended ceiling that can nevertheless produce a homogeneous light output. This is not trivial as the width of the strip is limited, which makes it difficult to ensure that the light generated by the solid state lighting elements is homogeneously distributed over the full width of the lighting strip by the optical waveguide. It has surprisingly been found that the provision of a tapered optical waveguide in such a lighting strip ensures a good homogeneity in the light output of the lighting strip. This is because the tapered surface, particularly when facing the reflective surface, ensures that the light is forced out of the optical waveguide in a symmetrical and highly collimated manner, thus improving homogeneity as well as light intensity of the light output by the lighting strip, as will be explained in more detail below.

It should be understood that when designing a lighting strip that is both narrow and long, such as the present lighting strips for panel supports, it is advantageous to include a glare reducing member such as a micro-lens optical plate, as such structures lead to good uniformity of the light emitted from the strip. This is because light emitted from the optical waveguide under unsuitable angles is reflected back into the lighting strip by the glare reducing member. However, this can negatively affect the luminance efficiency of the lighting strip due to unwanted absorption of the light inside the lighting strip, most notably by the solid state lighting elements. This may be exacerbated if the optical waveguide comprises outcoupling elements as they create a scattering of the light, part of which will be directed towards the solid state lighting elements. The present invention has been based on the realization that the use of a tapered optical waveguide significantly improves the luminance efficiency of the lighting strip, and obviates the need for the presence of the outcoupling elements (although they may still be present).

In an embodiment, the optical waveguide comprises a second tapered portion increasing in thickness from the center towards the second side of the lighting strip, the lighting strip further comprising a second plurality of solid state lighting elements placed along the second side of the lighting strip. This increases the light intensity that can be produced by the lighting strip. In this embodiment, the optical waveguide further provides the additional advantage that light emitted by solid state lighting elements on the one side of the lighting strip is largely prevented from reaching the opposite side of the lighting strip, where such light could be absorbed by the phosphors or the packaging of the solid state lighting elements at the opposite side, which would have the negative effect of significantly reducing the optical efficiency of the lighting strip. Hence, in this embodiment, both uniformity and optical efficiency of the lighting strip are improved. The first tapered portion and the second tapered portion preferably form a single structure as this reduces the manufacturing complexity of the lighting strip as well as avoids optical artifacts occurring at the interface between the two tapered portions.

Preferably, the lighting strip further comprises a diffusion structure located in between the optical waveguide and the glare reducing member. The light from the solid state lighting elements largely exits the tapered optical waveguide at high angles from the normal (i.e. the axis that is perpendicular to the exit plane of the lighting strip). In some cases, this can cause unwanted absorption of the light by the solid state elements. The presence of such a diffusion structure redirects the light angles towards the normal, thereby improving the luminance efficiency of the lighting strip.

In a particularly advantageous embodiment, the diffusion structure comprises a redirection foil comprising a plurality of linear prisms, the tops of said prisms facing the first and second tapered portions. Preferably, the linear prisms have top angles of around 70°. Such a film is particularly efficient in redirecting the light emitted from the tapered portions of the optical waveguide.

In an alternative embodiment, the optical waveguide comprises the tapered portion and the further tapered portion stacked between the reflective surface and the glare reducing member, the respective tapered surfaces of the tapered portion and the further tapered portion facing each other, the lighting strip further comprising a further diffusion structure in between said tapered surfaces. This embodiment is particularly favorable as it is easy to manufacture and has improved luminance efficiency due to the fact that the further diffusion structure reduces the risk that light exiting one of the tapered portions in the direction of the other tapered portion is (temporarily) trapped in the other tapered portion by way of total internal reflection, which would increase the risk of the light being reabsorbed by one of the solid state lighting elements.

The lighting strip may further comprise a plurality of light scattering members for extracting light from the optical waveguide. Each light scattering member may comprise a scattering line, which preferably is oriented in parallel with the first and second sides of the lighting strip. Said scattering lines may be attached to the optical waveguide, e.g. using a suitable adhesive, or may otherwise be formed on the surface of the optical waveguide.

Alternatively, the plurality of light scattering members may be comprised in a foil.

Preferably, the reflective surface is a light scattering surface as this further improves the homogeneity of the light produced by the lighting strip.

In an embodiment, the glare reducing member comprises a plurality of pyramid-shaped or conical structures for providing the light transmitted by the lighting strip with a half cone angle of approximately 65°. This ensures that the lighting strip complies with health and safety requirements, in particular ensures that the amount of glare produced by the lighting strip meets these requirements.

The first and second pluralities of solid state lighting elements may comprise subsets of solid state lighting elements having different colors, the subsets being individually controllable, which has the advantage that the color, or the color temperature, of the light produced by the lighting strip can be controlled in a homogeneous manner. Alternatively, the first plurality of solid state lighting elements may comprise elements capable of generating light of a first color and the second plurality of solid state lighting elements may comprise elements capable of generating light of a color different to the first color.

According to a further aspect of the present invention, there is provided a lighting system including a plurality of lighting strips of the present invention, the lighting system further comprising a controller for setting the light output of individual lighting strips as a function of at least one of incident daylight, room layout and room occupancy. This allows for the output of the lighting strips to be adapted to localized needs, e.g. in areas such as corridors, office spaces, printing areas and so on, and/or adapted in the presence of an occupant of the room. To this end, the lighting system may further comprise a presence sensor for detecting the presence of an individual in said room, the controller being responsive to the presence sensor.

According to yet another aspect of the present invention there is provided a support element for a modular panel system comprising a lighting strip of the present invention. The lighting strip may be attached to or integrated into the support element.

According to yet another aspect of the present invention there is provided a modular panel system comprising a support grid comprising support members for attaching to a building structure and support elements for extending between support members and a plurality of panels dimensioned to be supported by the support grid, wherein the support grid comprises a plurality of lighting strips of the present invention. The lighting strips preferably are integrated in or attached to the support elements.

Preferably, the ratio between the width of the exit window of the lighting strips and the pitch of the panel support elements in the support grid is chosen in the range of 0.02 to 0.08 to ensure that the lighting levels in the room comply with glare requirements. More preferably this ratio is chosen to be 0.04.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
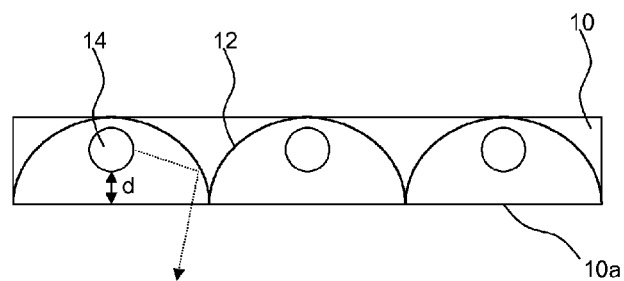
FIG. 1 schematically depicts a prior art luminaire for a modular panel system.
Figure 2:
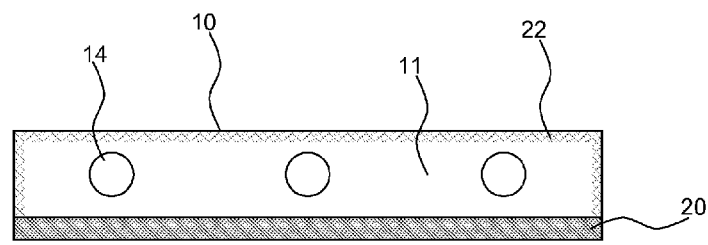
FIG. 2 schematically depicts another prior art luminaire for a modular panel system.

It should be understood that the figures are merely schematic and are not drawn to scale. It should also be understood that the same reference numerals are used throughout the figures to indicate the same or similar parts.

Figure 3:
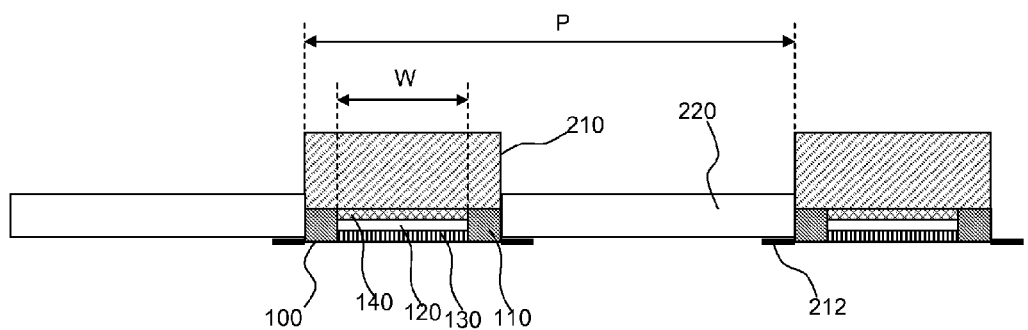
FIG. 3 schematically depicts a part of a modular panel system including a lighting strip according to an embodiment of the present invention.

FIG. 3 depicts a panel support element 210 of a modular panel system 200, which is designed to support panels or tiles 220. To this end, the panel support element 210 may comprise a lip 212 onto which the panel or tile 220 rests. Examples of such modular panel systems 200 include suspended ceilings and floors. The panel support element 210 comprises a lighting strip 100 in which solid state lighting elements, e.g. LEDs 110 are placed adjacent to an optical waveguide or light guide layer 120, which at regular intervals couples the light received from the solid state lighting elements 110 out to a glare reducing member 130, which ensures that the intensity of light emitted from the lighting strip 100 under shallow angles with the plane formed by the panels 220 is kept sufficiently low to suppress glare for inhabitants of a room in which the modular panel system 200 is fitted. The provision of light from the LEDs 110 to the glare reducing member 130 through a optical waveguide 120 further ensures that the glare reducing member 130 is illuminated in a uniform manner, thus improving the uniformity of the light output of the lighting strip 100, in particular when the optical waveguide has a tapered shape as will be explained in more detail below.

In an embodiment, the solid state lighting elements 110 are side-emitting LEDs, i.e. LEDs that are arranged to emit light in the width direction W of the lighting strip 100. Alternatively, the LEDs may be arranged to emit light in the length direction of the lighting strip 100, in which case the optical waveguide 120 may further comprise a regular pattern of protrusion in between which the LEDs are placed such that the emitted light is coupled into optical waveguide by the protrusions.

The glare reducing member 130 preferably is a micro-lens optical (MLO) plate or prism plate, which preferably is in the form of a thin foil having a thickness of less than 5 mm, and more preferably no more than 1 mm. It has been found that such a foil can be used when the LEDs 110 can be operated in the so-called Safe Extra Low Voltage Domain, for which the fire proof requirements as for instance tested by the 5VA and glowwire tests are less stringent. Such a mode of operation may for instance be achieved if the density of luminaires, i.e. light strips 100 in the modular panel system 200 is high enough to ensure sufficient lighting levels in the room when operating the luminaires 100 in the safe extra low voltage domain, as will be explained in more detail below.

The glare reducing member 130 typically reflects substantial amounts of light originating from the optical waveguide 120 back into this layer. It is therefore advantageous to provide a reflective layer 140 such that the optical waveguide 120 is sandwiched between the reflective layer 140 and the glare reducing member 130. The reflective layer 140 may for instance be a reflective foil, a layer of white paint applied to the surface of the panel support element 210 facing the lighting strip 100 or to the surface of the optical waveguide 120 facing the panel support element 210. Other embodiments of such a reflective layer 140 are equally feasible.

The use of a MLO plate or foil 130 makes it possible to keep the overall thickness of the lighting strips 100 to less than 5 mm, in particular when side-emitting LEDs 110 are used that are placed at the sides of (i.e. adjacent to) the optical waveguide 120. This reduces the weight and cost of the luminaire as fewer materials need to be used to realize the desired lighting levels.

The dimensions of the MLO layer 130, or more precisely, the width W of the exit window of the MLO layer 130, are preferably chosen to be 0.04 times the pitch P of the panel support elements 210 as shown in FIG. 3, as at this ratio the optimal tradeoff between light output and minimalistic appearance is achieved. A commonly used width for panel support elements 210 is 2.4 cm. By defining the pitch of the support elements 210 (in the width direction) at 60 cm, sufficient luminance levels can be achieved in a room whilst driving the light strips 100 in the safe extra low voltage domain, as previously mentioned. Satisfactory results are still obtained if the aforementioned ratio lies in the range of 0.02 to 0.08.

If the value of this ratio falls below 0.02 the density of panel support elements 210 becomes too high for the modular system 100 to be cost-effective, and its appearance becomes unsatisfactory. If the value of this ratio exceeds 0.08 the spacing between luminaires 100 increases to such an extent that the output levels of each luminaire 100 have to increased to ensure homogeneous lighting of the room to such a level that glare can no longer be avoided; i.e. the luminaires 100 can no longer be operated in the safe extra low voltage domain.

By dimensioning the solid state lighting luminaires or strips 100 in a modular panel system 200 such that the width of the light exit window of the luminaire 100 falls within the W/P ratio of 0.02 to 0.08, the output levels per luminaire 100 can be reduced to such an extent that the intensity of emitted light that is perceived as glare can be kept to allowable levels as dictated in the various legislatory standards.

The lighting strip or luminaire 100 preferably has a light output in lumen in excess of 500 times the pitch (in meters) of the elements used per meter of lighting strip or luminaire 100. This leads to typical lumen outputs per meter luminaire of more than 150 lumen as much as up to 600 lumen. This typically ensures that no additional lighting has to be present in a room fitted with the modular panel system 200 of the present invention, i.e. a modular panel system including the lighting strips 100. It is also preferred that the pitch of the panel support elements 210 in the modular panel system 200 is chosen in the range of 0.3 to 3.0 meters for indoor use as this ensures sufficiently uniform lighting levels in the room.

Upon assembly of the modular panel system 200 in a room, the support elements 210 are preferably aligned parallel to the window(s) in the room that receive most daylight. As the lighting strips 100 in support elements 210 typically are individually controllable, this makes it straightforward to adjust the lighting levels in the room to the incident daylight, i.e. by dimming the lighting strips 100 in support elements 210 near to the window by a larger extent than the lighting strips 100 in support elements 210 further away from the window.

To this end, the plurality of lighting strips 100 on different support elements 210 typically form part of a lighting system that further comprises a controller (not shown) for adjusting the output of the individual lighting strips 100 in accordance with lighting requirements in the room. Such control signals may for instance be configured to adjust the lighting levels in accordance with a layout of a room comprising the modular panel system 200. For instance, the room may be partitioned into work areas connected to each other by one or more corridors, in which the work areas are to receive higher lighting levels than the corridors. To this end, the controller may increase the light output of the lighting strips 100 located over the work areas whilst reducing the light output of the lighting strips 100 located over the corridors.

Similarly, the controller may adapt the light output of the lighting strips 100 to compensate for disruptions in the regularity of the grid of the modular panel system 200, for instance if the modular panel system 200 is fitted around air ventilation shafts or air-conditioning units. The controller may be adapted to increase lighting levels in the vicinity of such disruptions to compensate for the absence of lighting underneath such disruptions.

The lighting system may further comprise one or more sensors, such as daylight sensors and/or presence sensors for detecting the presence of an individual in the room, with the controller being responsive to these sensor(s) such that the lighting levels can be adapted accordingly.

At this point it is noted that MLO-based glare reducing members 130 can have a metallic appearance at relatively high light output levels. This is sometimes considered unappealing. A presence sensor may be used to adjust the lighting levels in the presence of one or more individuals in the room to sufficient levels to allow the individuals to perform their activities, with these light levels being sufficiently low to avoid the metallic appearance of the MLO-based glare reducing member 130 such that overall appearance of the modular panel system 200 is improved.

In FIG. 3, the lighting strip 100 is integrated into the panel support elements 210, which preferably are secondary support elements of the modular panel system 200, i.e. elements that are not fixed to a floor, wall or ceiling of a room, such that the panel support elements 210 can be easily replaced in case of, e.g. an end of life malfunction of the lighting strip 100, i.e. without having to remove the primary support elements from the ceiling, wall or floor. This also has the advantage that the lighting strip can be easily retrofitted in existing modular panel systems by replacing the support elements of the modular panel system with the panel support elements 210 of the present invention.

The support element 210 including luminaire 100 may have a light exit window of 24 mm (width) by 60 cm (length). Such a luminaire would have a light output of around 250 lm. Such a support element 210 may be used in a modular panel system 200 such as a suspended ceiling, by setting these luminaires in lines of panel support elements 210 having a pitch of 60 cm as previously explained. Other dimensions are equally feasible.

Figure 4:
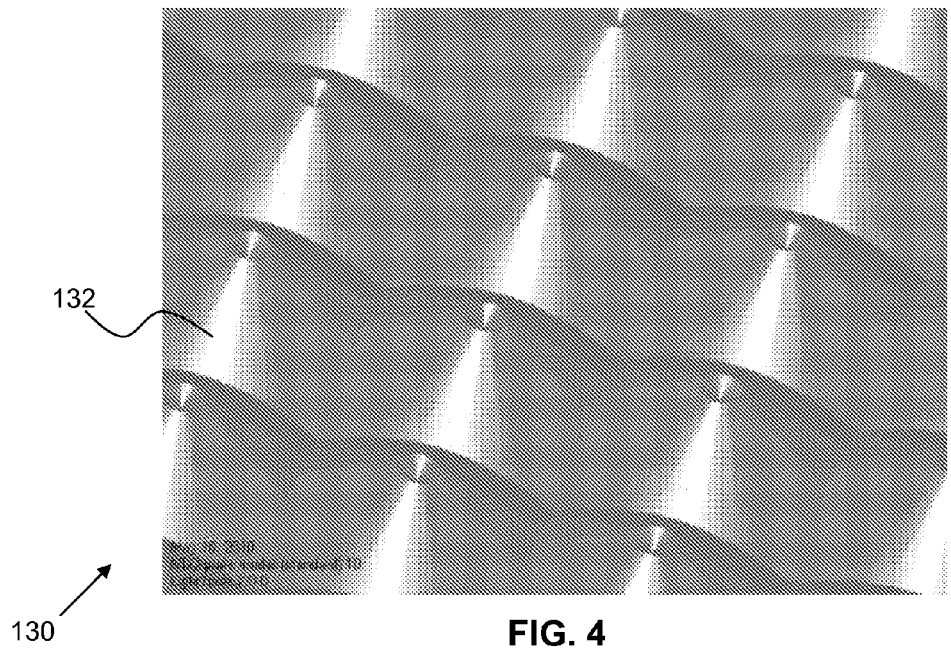
FIG. 4 schematically depicts a non-limiting example of a glare reducing member suitable for use in the lighting strip of the present invention.

FIG. 4 shows a non-limiting example of a MLO-based glare reducing foil 130, which consists of a rectangular array of cones or pyramids 132 with a top angle of 108° and a pitch of 50 micrometers. The small dimple in the top of each cone 132 is present for manufacturing reasons. The pitch of the cones 132 may be varied without departing from the scope of the present invention. The cones may be made of any suitable transparent material, e.g. PMMA or polycarbonate. As such MLO-based glare reducing members 130 are known per se, their manufacture will not be explained in further detail for the sake of brevity. Alternative embodiments of the glare reducing member 130 are also feasible; an example of another suitable glare reducing member 130 can for instance be found in WO-2008/058585 A1.

Figure 5:
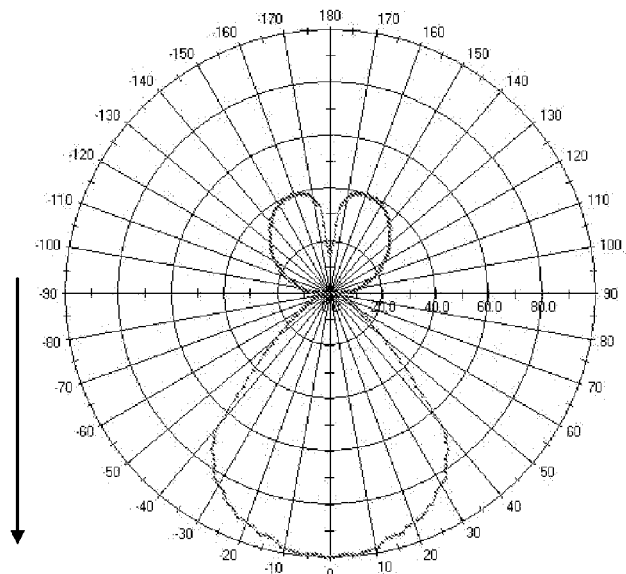
FIG. 5 depicts the simulation results of the light distribution of the glare reducing member of FIG. 4 when used in conjunction with a lambertian light source.

FIG. 5 depicts the simulated angular light intensity distribution of the MLO foil 130 shown in FIG. 4 when a lambertian light source is placed below the MLO foil 130. The arrow indicates the direction of the light rays that have passed through the MLO foil 130. The light transmitted in the opposite direction is light that has been reflected by the MLO foil 130. Such reflected light can be recycled by the use of diffuse reflectors as previously explained.

As can be seen in FIG. 5, the light intensity at a 65° angle relative to the vertical light emission axis is very low. As light emitted at around these angles typically causes glare, it can be seen that the MLO foil 130 can effectively suppress glare. For the MLO foil 130 in a light strip 100 in a modular panel system 200 at a W/P ratio of 0.04 and operating at a luminance output of 380 lm/m luminaire, luminance levels at 65° have been found to be at around 1100 $cd/m^2$, which is well below the requirement of such levels not exceeding 1500 $cd/m^2$. This equated to a glare evaluation rating according to the UGR method of less than 17, which is well under the UGR requirement of 19 or less.

Figure 6:
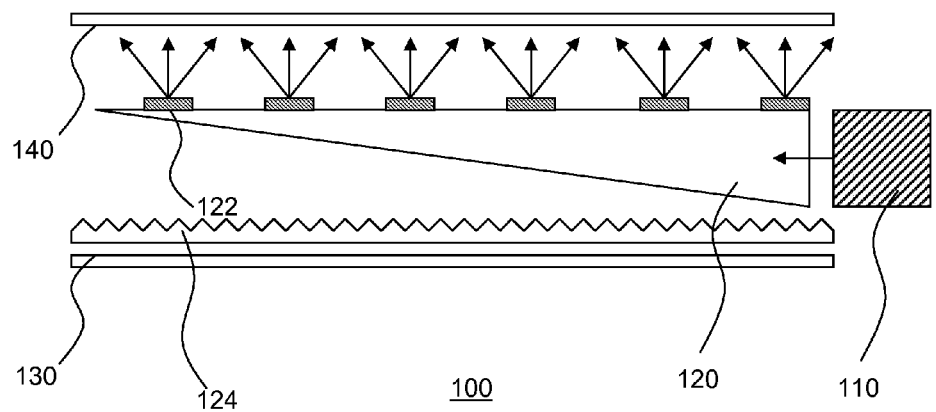
FIG. 6 schematically depicts a side view and FIG. 7 schematically depicts a top view of a lighting strip according to an embodiment of the present invention.

As previously mentioned, in accordance with an embodiment of the present invention, the optical waveguide 120 has a tapered shape to facilitate a homogeneous light output from the lighting strip 100. This is shown in FIG. 6. The optical waveguide 120 tapers outwardly, i.e. increases in thickness towards the side of the lighting strip 100 at which the row of solid state lighting elements 110 has been placed. The optical waveguide 120 preferably extends over the full width W of the lighting strip 100.

The LEDs 110 may be, so that, particularly when the LEDs 110 are provided on both sides of the optical waveguide 120, one does not need to carefully place the optical waveguide 120 next to or between the row(s) of LEDs 110. Furthermore, providing the LEDs 110 in optical contact with the optical waveguide 120 ensures that all the light that is emitted by the LEDs 110 is coupled into the optical waveguide 120. Although because of a lack of total internal reflection a part of this light may leave the optical waveguide 120 rather quickly after entrance, either from the bottom or top side, this light leaves the optical waveguide 120 in a direction that is substantially the same as the direction along which light leaves optical waveguide 120 further on, so that the same redirection foil can also be used also close to the LEDs 110.

In planar waveguides, light extraction is generally performed by surface modification of the light guide, i.e., the surface smoothness that facilitates the total internal reflection properties of the waveguide is replaced with a scattering pattern on a surface of the waveguide that redirects the light ray beyond the critical angles for total internal reflection. Known examples of such scattering structures include white paint dots that are distributed in a (regular) pattern on the surface so as to obtain uniform light extraction. However, if the extraction efficiency has to be high, e.g. preferably as close to 100%) as possible but the distance between the entry point of the light into the waveguide and the light extraction point from the waveguide is very short, then the white paint dot density has to increase towards a uniform white scattering surface in order to obtain high extraction efficiencies. This however has the consequence that the uniformity of the luminance is negatively affected. In contrast, creating a non-uniform, i.e. patterned scattering surface for the purpose of increasing uniformity reduces the optical extraction efficiency.

This problem is addressed in the waveguide 120 shown in FIG. 6 as this waveguide is able to extract light in an efficient and uniform manner within a small emitting surface area close to the light collecting facet (the entry point of the emitted light), and therefore close to the high brightness point source (i.e. the solid state lighting elements).

The tapered waveguide 120 may optionally comprise a scattering surface pattern at its surface facing a transmissive scattering projection screen, e.g. a reflective surface 140. In FIG. 6, the scattering surface pattern is implemented as a plurality of scattering lines 122, which may be surface modifications such as grooves, scratches, lines of white paint and so on. As will be demonstrated below, it has been found by calculation that such an arrangement allows for the production of a uniform light distribution as shown in FIG. 4 at an optical efficiency exceeding 80%. It is however noted that such efficiencies may be obtained without the presence of the scattering surface pattern.

The arrangement shown in FIG. 6 is based on the following operating principle. The tapered shape of the optical waveguide 120 forces light to exit the waveguide from both its top and bottom surface in a symmetrical manner with a high degree of collimation. The linear scattering surface elements 122 are optimized in width and density using common optical principles. Consequently, two different light extraction patterns are obtained; a first pattern comprises significantly collimated light oriented mostly normal to the tapered surface and a second pattern that is omnidirectional.

In order to create a uniform luminescent surface a diffuser, e.g. a linear prism foil 124 is placed between the optical waveguide 120 and a glare reducing member 130 such as the MLO plate of FIG. 4. The diffuser has to be placed in between the tapered optical waveguide 120 and the observer at a well defined position, e.g. close to the tapered optical waveguide 120. The distance of this diffuser to the optical waveguide 120 should be well-defined. This distance can be calculated in manner similar to the determination of a focal plane of a lens; outside the 'focal' plane of the diffuser, the extraction mechanisms do not yield a uniform light distribution. The scattering coefficient of the diffuser may be between 10° and 80°. In a preferred embodiment, the diffuser comprises a linear prism redirection foil having linear prisms with a top angle of approximately 70°. The redirection foil redirects incident light that has a large deviation from the normal towards the normal, such that the glare reducing member 130 is provided with collimated light at appropriate angles such that the majority of the light entering the glare reducing member 130 is not reflected back into the lighting strip 100, thereby reducing unwanted absorption in the lighting strip and improving the luminance efficiency of the lighting strip 100.

Figure 7:
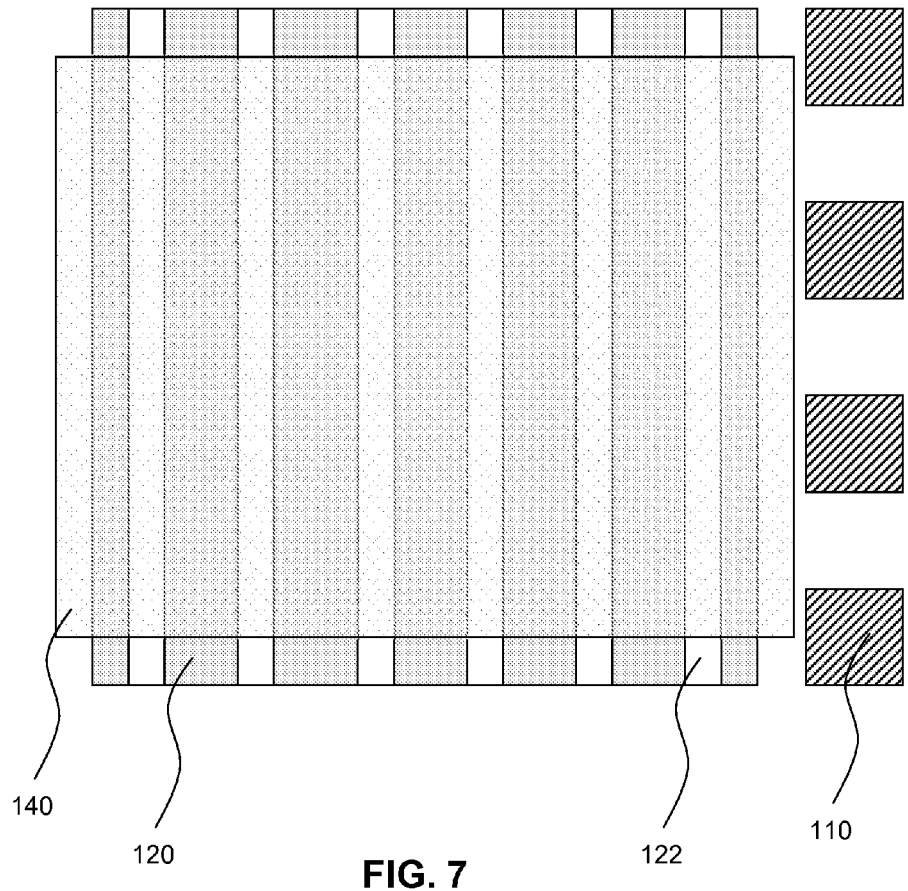

Light that however is reflected back from the glare reducing member 130 can be efficiently recycled by the presence of a reflective member 140 at the opposite plane of the lighting strip 100. It is further noted that the probability of light absorption by the package of the solid state lighting element 100 is small, given typical aspect ratio of e.g. 12 mm or 24 mm width and 1 mm height of the tapered waveguide 120. FIG. 7 depicts a top view of the light guide 100.

Figure 8:
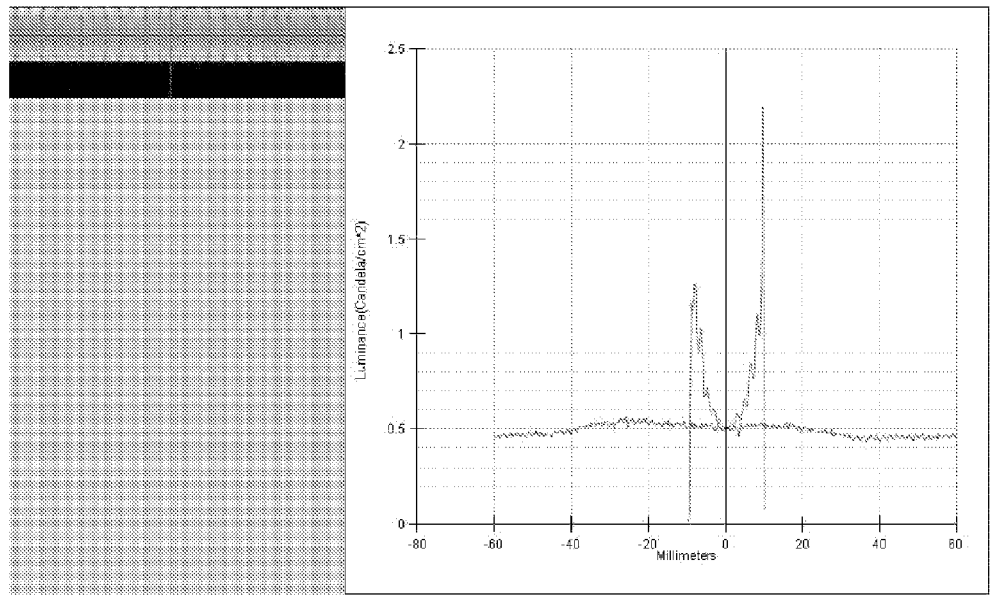
FIG. 8 depicts a simulation result of the light output distribution of a lighting strip having a planar optical waveguide.
Figure 9:
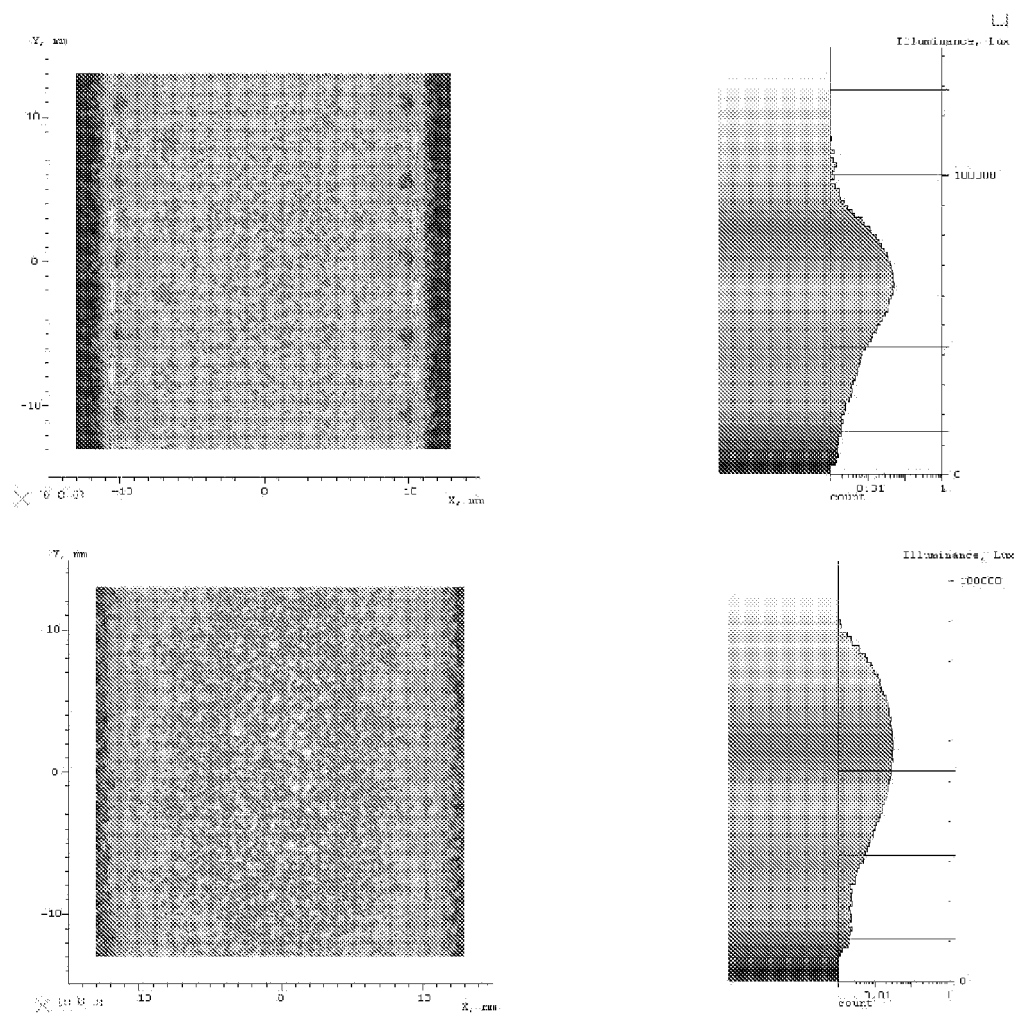
FIG. 9 depicts a simulation result of the light output distribution of a lighting strip according to an embodiment of the present invention.

FIGS. 8 and 9 respectively show the calculation results of the luminance from a lighting strip having a planar optical waveguide and a tapered optical waveguide 120 in accordance with an embodiment of the present invention. As can be seen from FIG. 8, the luminance of the lighting strip having a planar waveguide in the in the long and short direction. As can be seen from FIG. 8 a noticeable inhomogeneity is present in the distribution of the luminance of the light strip. The optical efficiency of this light strip is determined to be 46%. In contrast, the light strip 100 according to an embodiment of the present invention having a tapered optical waveguide 120 displays a noticeably improved homogeneity in its luminance distribution. The left hand top pane of FIG. 9 depicts the calculated luminance of the diffuser 130 whereas the left hand bottom pane depicts the luminance 1.0 mm above the optical waveguide 120. The right hand panes show the light intensity distribution in the width direction W of the lighting strip 100. The optical efficiency of the lighting strip 100 is calculated to exceed 80%, a marked improvement over the lighting strip having a planar optical waveguide.

Figure 10:
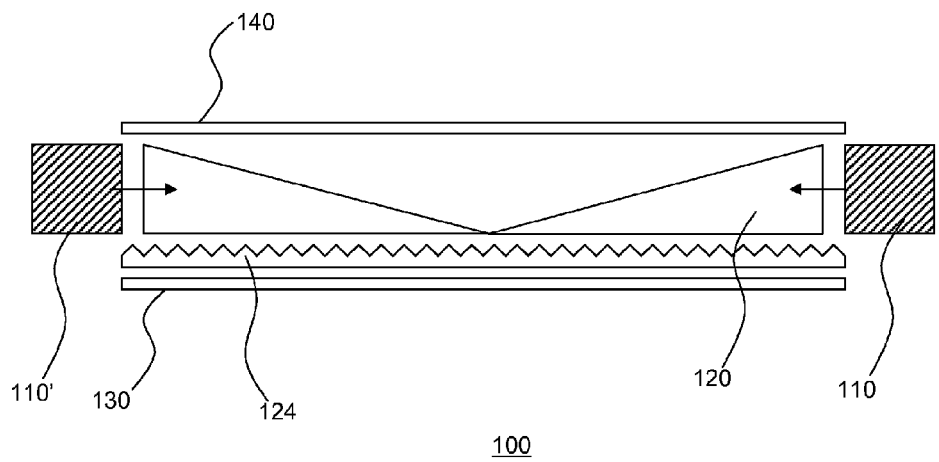
FIG. 10 depicts a side view of a lighting strip according to another embodiment of the present invention.

A particularly advantageous embodiment of the lighting strip 100 is shown in FIG. 10. Here, the optical waveguide 120 comprises two tapered portions that both taper from the centre of the lighting strip 100 to its sides, i.e. extend in thickness towards the sides of the lighting strip 100. The two tapered portions are preferably fused together, i.e. the optical waveguide 120 is a single structure to prevent the occurrence of optical artefacts at the interface between the two tapered portions. However, it is expressly pointed out that an embodiment in which separate tapered portions are used is also feasible. It is noted that the orientation of the sloped surface of the tapered optical waveguide 120 is not critical. This surface may face the glare reducing member 130 as well as the reflective surface 140. The tapered optical waveguide 120 may even comprise tapered surfaces on either side.

A diffusing or scattering reflective layer 140 is facing the tapered surfaces of the optical waveguide 120 to redirect light exiting the tapered surfaces towards the optical waveguide. The reflective layer 140 typically is placed facing the panel support element 210. Preferably, the reflective layer or diffuser 140 is not in direct optical contact with the optical waveguide 120 to reduce the dwell time of the light inside the optical waveguide 120. In an embodiment, the reflector 140 is curved towards the optical waveguide 120 (i.e., has a convex shape) to minimize the distance between the reflector 140 and the optical waveguide 120.

Facing the opposite surface of the optical waveguide 120 is the glare reducing member 130, e.g. the MLO plate as shown in FIG. 4, which is separated from the optical waveguide 120 by a redirection foil 124 comprising a plurality of light redirection members, e.g. linear prisms to collimate (redirect) the light coupled out of the optical waveguide 120 as previously explained. Instead of a redirection foil, a diffuser may also be used for this purpose.

The lighting strip 100 further comprises respective groups of solid state elements 110 and 110' on either side of the optical waveguide 120, which may be organised as regular patterns in the length direction of the lighting strip 100. In an embodiment, the groups of solid state lighting elements 110 and 110' comprise subsets of solid state lighting elements having different white colors, e.g. a warm white and a cold white color. By making these subsets individually controllable, the light temperature of the light output of the lighting strip 100 can be controlled. Alternatively, the solid state lighting elements within a single group may have the same color, with different groups having different colors.

Figure 11:
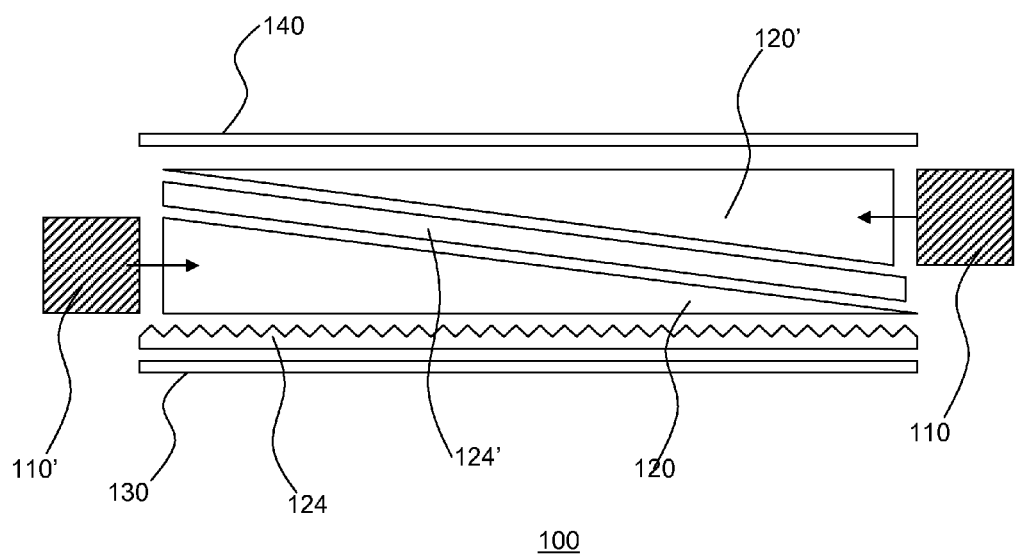
FIG. 11 schematically depicts a side view of a lighting strip according to another embodiment of the present invention.

An alternative to the embodiment shown in FIG. 10 is shown in FIG. 11. In this embodiment, two tapered portions 120 and 120' are stacked in a vertical direction, i.e. along the axis of the intended emission direction of the light produced by the lighting strip 100. As can be seen in FIG. 11, the tapered sides of the tapered portions 120 and 120' are placed opposite to each other such that they face each other, with the first or lower tapered portion 120 tapering in a first direction and the second or upper tapered portion 120' tapering in the opposite direction.

The facing tapered surfaces of the tapered portions 120 and 120' are separated from each other by a further redirection foil 124', which thickness is preferably minimized to limit the overall thickness of the lighting strip 100. The further redirection foil 124' changes the angle of the light exiting the tapered portions 120 and 120' such that light exiting the upper tapered portion 120' in a direction towards the lower tapered portion 120 is more effectively directed towards the redirection foil 124 and glare reducing member 130, such that the dwell time of the light, i.e. the number of inner reflections, in the bottom tapered portion 120 is reduced, thereby reducing the risk that the light is absorbed by a solid state lighting element 110 facing the vertical side of the lower tapered portion 120, i.e. thus improving luminance efficiency. Similarly, the further redirection foil 124' ensures that the light exiting the lower tapered portion 120 in a direction towards the upper tapered portion 120' is more effectively directed towards the reflective layer or diffuser 140, thus reducing the number of inner reflections in the upper tapered portion 120', thereby reducing the risk that the light is absorbed by a solid state lighting element 110' facing the vertical side of the upper tapered portion 120'.

Compared to the embodiment of FIG. 10, the embodiment of FIG. 11 has the benefit of further improved luminance efficiency and manufacturing simplicity as the alignment of the tapered portions 120 and 120' is more easily achieved, or, in case the tapered portions 120 in FIG. 10 are physically connected, a more robust solution is obtained as the connection between the tapered portions 120 in FIG. 10 may be fragile. These advantages come at the cost of an additional optical element, i.e. the further redirection foil 124', in the lighting strip 100. It should therefore be understood that the embodiments as shown in FIG. 10, with two wedge portions placed in the same plane, and FIG. 11, with two wedge portions placed in a stack, have different advantageous properties, and that both embodiments provide equally suitable solutions to the technical problem addressed by the present invention.

At this point is noted that features shown in different embodiments of the present invention may be interchanged and combined without departing from the teachings of the present invention. For instance, the strips 122 in FIG. 6 may be replaced with the foil 124 in FIGS. 10 and 11 and vice versa. Other variations will be apparent to the skilled person.

Figure 12:
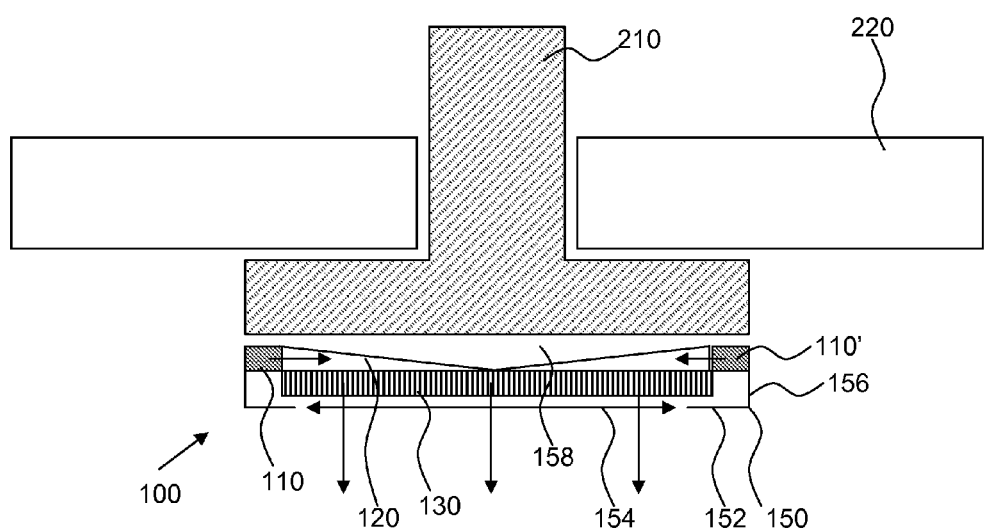
FIG. 12 schematically depicts a part of a modular panel system including a lighting strip according to another embodiment of the present invention.

FIG. 12 shows an alternative embodiment of a lighting strip 100, which is particularly suited for retrofitting purposes. The lighting strip 100 is fitted to the exposed surface of a panel support element 210 rather than being integrated into the panel support element 210. The panel support element 210 is T-shaped by way of non-limiting example only. The lighting strip 100 comprises a housing 150 including a bottom surface 152 including a light exit window 154, a top surface 158 facing the T-shaped panel support element 210 and side surfaces 156 extending from the bottom surface 152 to the top surface 158 in a length direction of the housing 150. The glare reducing member 130 is fitted, e.g. fixated over the light exit window 154, with the optical waveguide 120 being located in between the top surface 158 and the glare reducing member 130. The glare reducing member 130 may be kept in place by a reflective surround, which improves the light output of the lighting strip 100.

LEDs 110 and 110', which may be side-emitting LEDs, are located in between the optical waveguide 120 and one of the side walls 156 such that their light output (as indicated by the horizontal arrows) is coupled into the optical waveguide 120 for coupling out the light such that shallow angled light beams are largely avoided (as indicated by the vertical arrows).

The material of the housing 150 may be flexible, e.g. made of a plastics material. The housing 150 may be reflective on the inside to maximize the light output of the lighting strip 100. Any suitable reflective material may be used. The material of the housing 150 may be reflective or the inner surfaces of the housing 150 may be coated with a reflective material. In addition, a reflective layer may be present between the upper surface 158 of the housing 150 and the optical waveguide 120.

The outer surface of the upper surface 158 may contain an adhesive for fixing the lighting strip 100 to the panel support element 210. Alternatively, the lighting strip 100 may be clamped to the panel support element 210 using suitable clamps. Alternative fixation means will be apparent to the skilled person. Although the embodiment of the lighting strip 100 in FIG. 12 is shown separate to the panel support element 210, it should be understood that it is equally feasible to integrate this embodiment into a panel support element 210 as shown in FIG. 3.

Figure 13:
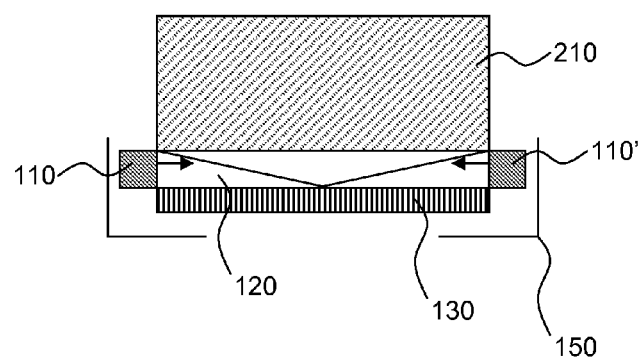
FIG. 13 schematically depicts a part of a modular panel system including a lighting strip according to yet another embodiment of the present invention.

FIG. 13 shows yet another embodiment of the lighting strip 100, in which the LEDs 110 and 110' are placed in parallel with and on the edge of the panel support element 210, and in which the housing 150 forms a cladding around the support element 210. The LEDs 110 and 110' may be high-power LEDs in this embodiment. This embodiment is also particularly suitable for retrofitting purposes. Alternatively, such a lighting strip 100 may be fitted to a panel support element 210 during its assembly.

Figure 14:
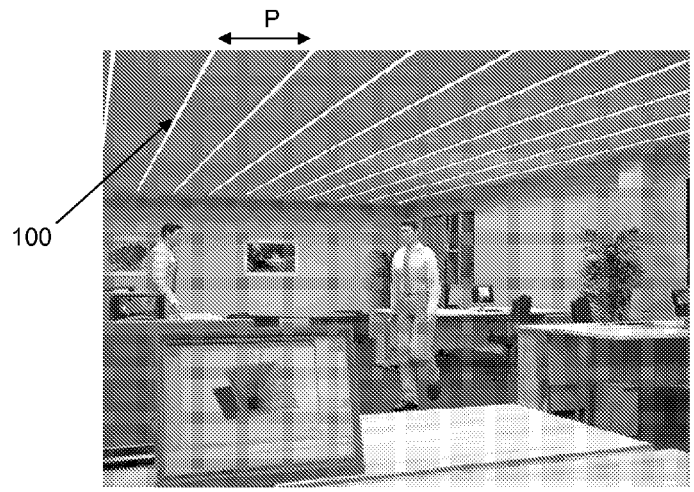
FIG. 14 schematically depicts a room with a modular panel system according to an embodiment of the present invention.

FIG. 14 shows a simulation of the appearance of a room fitted with a modular panel system, here a suspended ceiling, comprising lighting strips or luminaires 100. The modular panel system may have primary support beams, e.g. band rasters, which run perpendicularly to the luminaires 100, with support elements extending between adjacent primary support beams being extended with the luminaires 100. Simulations have demonstrated that for a lighting strip 100 having a width of 24 mm and a length of 60 cm in a ceiling having lines of panel support elements 210 at a pitch P of 60 cm, a luminance of 500 lux can be achieved at the working surfaces in the room by having each lighting strip 100 having a luminous output of 230 lumen, i.e. 380 lumen/m of the strips 100.

Figure 15:
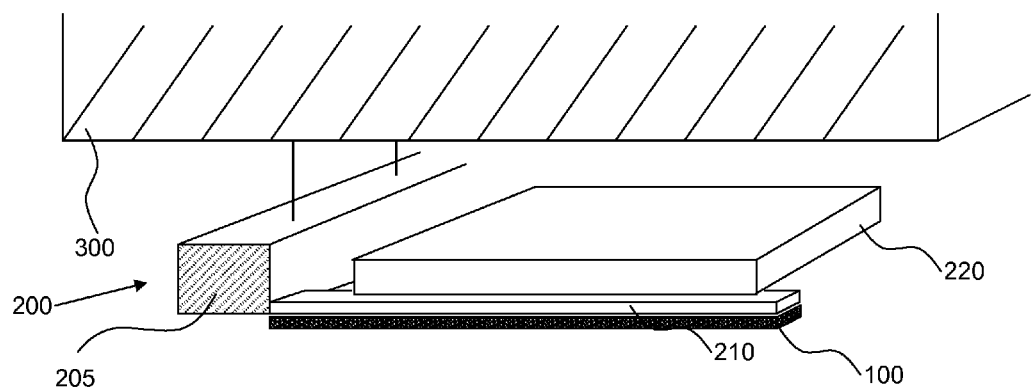
FIG. 15 schematically depicts a modular panel system according to an embodiment of the present invention in more detail.

As shown in FIG. 15, which depicts a non-limiting example of a modular panel system 200, the primary support beams 205 of the modular panel system 200 are suspended from the ceiling 300 of a room, with the panel support elements 210 carrying the panels or tiles 220 extending between primary support beams 205. The luminaire 100 is fitted to the panel support elements 210, for instance by integration into the panel support elements 210 or by attachment thereto, as previously explained. As the panel support elements 210 can be easily removed from the modular panel system 200 without dismantling the whole system, e.g. removing it from the ceiling 300, it is straightforward and cost-effective to retrofit the luminaire 100 into the modular panel system 200, either by replacing a prior art panel support element 210 with a panel support element 210 of the present invention, or by attaching the luminaire 210 to an existing panel support element 210. It is of course also feasible to integrate a luminaire 100 of the present invention into a primary support beam 205 or retrofit it thereto, although this is likely to be less straightforward and not as cost-effective as the (retro-)fitting to panel support elements 210. It is reiterated that for a modular panel system 200 in accordance with the present invention, it is preferred that the ratio of the width W of the exit window the lighting strips 100 and the pitch P of the panel support elements 210 is chosen in the range 0.02 to 0.08, and W/P preferably is 0.04 for the reasons already explained above.

It is further noted that a lighting strip 100 according to at least some of the embodiments of the present invention can be manufactured in a low-cost manner, e.g. using extrusion or roll-to-roll techniques due to the fact that the optical elements in the lighting strip 100 are symmetrical in the length direction of the strip. The electronics in the lighting strip 100 of the present invention may further be designed such that the lighting strip 100 can be easily cut at any length without losing uniformity.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting strip for mounting in or on a panel support element of a modular panel system, the lighting strip comprising:
    an optical waveguide having a first tapered portion increasing in thickness from the center towards a first side of the lighting strip;
    a first plurality of solid state lighting elements placed along the first side of the lighting strip;
    a reflective surface and a light output surface comprising a glare reducing member, each extending between the first side of the lighting strip and a second side of the lighting strip, the second side being opposite to the first side,
    wherein the optical waveguide is located between the reflective surface and the glare reducing member.

2. The lighting strip of claim 1, wherein the optical waveguide comprises a second tapered portion increasing in thickness from the center towards the second side of the lighting strip, the lighting strip further comprising a second plurality of solid state lighting elements placed along the second side of the lighting strip.

3. The lighting strip of claim 2, further comprising a diffusion structure in between the optical waveguide and the glare reducing member.

4. The lighting strip of claim 3, wherein the diffusion structure comprises a redirection foil comprising a plurality of linear prisms, said prisms facing the first and second tapered portions.

5. The lighting strip of claim 2, wherein the tapered portion and the further tapered portion are stacked between the reflective surface and the glare reducing member, the respective tapered surfaces of the tapered portion and the further tapered portion facing each other, the lighting strip further comprising a further diffusion structure in between said tapered surfaces.

6. The lighting strip of claim 1, further comprising a plurality of light scattering members for extracting light from the optical waveguide.

7. The lighting strip of claim 6, wherein the each light scattering member comprises a scattering line.

8. The lighting strip of claim 7, wherein the scattering lines are oriented in parallel with the first and second sides of the lighting strip.

9. The lighting strip of claim 4, wherein the plurality of light scattering members are comprised in a foil.

10. The lighting strip of claim 1, wherein the glare reducing member comprises a plurality of pyramid-shaped or conical structures for providing the light transmitted by the lighting strip with a half cone angle of approximately 55° to 65°.

11. The lighting strip of claim 2, wherein the first plurality of solid state lighting elements and the second plurality of solid state lighting elements each comprise subsets of solid state lighting elements having different colors, the subsets being individually controllable.

12. A lighting system including a plurality of lighting strips as claimed in claim 1, the system further comprising a controller for setting the light output of individual lighting strips as a function of at least one of incident daylight, room layout and room occupancy.

13. A panel support element for a modular panel system comprising a lighting strip as claimed in claim 1.

14. A modular panel system comprising:
    a support grid comprising support members for attaching to a building structure and panel support elements for extending between support members;
    a plurality of panels dimensioned to be supported by the support grid;
    wherein the support grid comprises a plurality of lighting strips as claimed in claim 1.

15. The modular panel system of claim 14, wherein:
    the panel support elements are placed in the support grid at a pitch (P);
    each of the lighting strips comprise a light exit window having a width (W); and
    the ratio W/P lies in the range of 0.02 to 0.08.

16. A lighting strip for mounting in or on a panel support element of a modular panel system, the lighting strip comprising:
- an optical waveguide having a first tapered portion increasing in thickness from the center towards a first side of the lighting strip;
- a first plurality of solid state lighting elements placed along the first side of the lighting strip;
- a reflective surface and a light output surface comprising a glare reducing member, each extending between the first side of the lighting strip and a second side of the lighting strip, the second side being opposite to the first side;
- the optical waveguide located between the reflective surface and the glare reducing member, and having a second tapered portion increasing in thickness from the center towards the second side of the lighting strip;
- a second plurality of solid state lighting elements placed along the second side of the lighting strip;
- the tapered portion and the further tapered portion stacked between the reflective surface and the glare reducing member;
- the respective tapered surfaces of the tapered portion and the further tapered portion in facing opposing relationship,
- a further diffusion structure in between said tapered surfaces.

* * * * *